United States Patent

Hasegawa et al.

[11] 4,287,549
[45] Sep. 1, 1981

[54] CIRCUIT FOR CHARGING A RELEASE MAGNET ENERGIZING CAPACITOR IN A CAMERA

[75] Inventors: Hiroshi Hasegawa; Osamu Maida, both of Tokyo, Japan

[73] Assignee: Nippon Kogaku K.K., Tokyo, Japan

[21] Appl. No.: 102,829

[22] Filed: Dec. 12, 1979

[30] Foreign Application Priority Data

Dec. 20, 1978 [JP] Japan ............................ 53-173921[U]

[51] Int. Cl.³ .......................... G03B 7/08; G03B 9/08
[52] U.S. Cl. ................................... 361/156; 354/234; 354/266
[58] Field of Search ............... 361/156, 155; 307/242, 307/246, 249; 354/234, 255, 266–268

[56] References Cited

U.S. PATENT DOCUMENTS

| | | | |
|---|---|---|---|
| 3,754,455 | 8/1973 | Tsujimoto et al. | 354/234 |
| 3,946,408 | 3/1976 | Taguchi | 354/266 |
| 4,099,192 | 7/1978 | Aizawa et al. | 354/234 |
| 4,104,666 | 8/1978 | Toyoda et al. | 354/234 |
| 4,143,958 | 3/1979 | Ishiguro et al. | 354/234 |

Primary Examiner—J. D. Miller
Assistant Examiner—L. C. Schroeder
Attorney, Agent, or Firm—Fitzpatrick, Cella, Harper & Scinto

[57] ABSTRACT

A capacitor charging circuit in a camera has switch means series-connected between a DC power source and a release magnet energizing capacitor. The switch means comprises a parallel connection of an emitter-grounded transistor for a first switch with the capacitor as the load and a collector-grounded transistor for a second switch with the capacitor as the load.

2 Claims, 3 Drawing Figures

CIRCUIT FOR CHARGING A RELEASE MAGNET ENERGIZING CAPACITOR IN A CAMERA

BACKGROUND OF THE INVENTION

1. Field of the Invention

This invention relates to a circuit for charging a release magnet energizing capacitor in an electromagnetic release camera.

2. Description of the Prior Art

Heretofore, in an electromagnetic release camera, switching transistors serially inserted between a DC power source and a release magnet energizing capacitor have been turned on to charge the release magnet energizing capacitor from the power source and during the shutter release, a release switch has been closed to cause the charge stored in the capacitor to be discharged to the release magnet coil. In cameras, from the requirement in actual armor, there was a tendency to employ integrated circuit (IC) elements and the above-described switching transistors are not exceptional. Transistors used in an IC are lateral transistors (operationally, PNP transistors) for the sake of reduced cost, but the ON resistance (saturation resistance) of such transistors becomes relatively high and therefore, if they are used for switching, there is a disadvantage that they take a longer charging time for the capacitor than discrete transistors. In contrast, if the switching transistor is emitter-grounded and the capacitor is used as the load of the emitter, then the internal resistance becomes smaller due to the negative feedback action, but there is a saturation voltage (collector-emitter voltage) of the order of 0.7 volt and therefore, a voltage drop occurs to give rise to a disadvantage that the capacitor is not sufficiently charged up to the source voltage. Also, in the former case, there is a fear that the charging voltage is deficient when continuous photography at short intervals is to be effected.

SUMMARY OF THE INVENTION

It is the object of the present invention to provide a charging circuit which is fast in charging speed and which suffers less from voltage drop.

The invention will become fully apparent from the following detailed description thereof taken in conjunction with the accompanying drawings.

DESCRIPTION OF THE PREFERRED EMBODIMENTS

Figure 1:
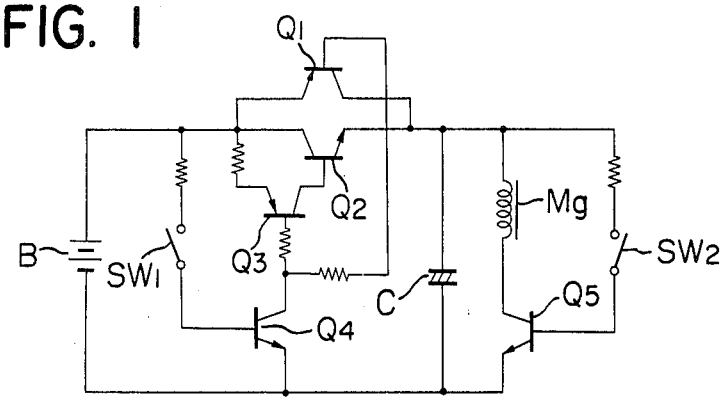
FIG. 1 is a circuit diagram showing an embodiment in the camera's release magnet driving circuit of the present invention.
Figure 2:
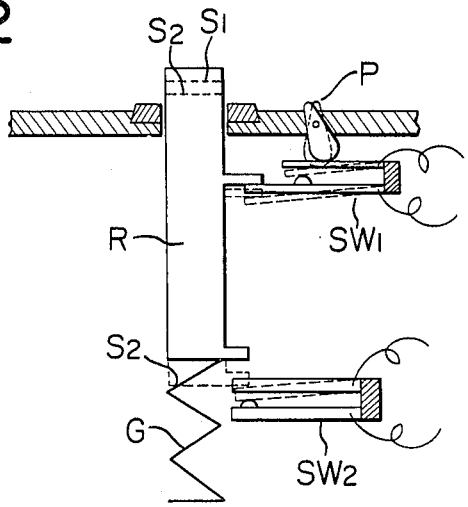
FIG. 2 is a view showing switches.

In FIG. 1 which shows an embodiment of the present invention, B designates a DC power source of voltage $E_1$, C designates a charging capacitor, Mg designates a release magnet coil, $Q_5$ designates a discharging switch transistor, $Q_1$-$Q_3$ designate a charging switch circuit, $Q_4$ designates a transistor for controlling the switch circuit, $SW_1$ designates a switch adapted to be closed by an operating member P and to be opened at a first position $S_1$ of a release lever R, as shown in FIG. 2, and $SW_2$ designates a switch adapted to be closed at a second position $S_2$ of the release lever R, as shown in FIG. 2.

When the switch $SW_1$ is closed by setting the operating member P to the dotted-line position of FIG. 2, the transistor $Q_4$ is turned on and as a result, the transistors $Q_1$-$Q_3$ are turned on to charge the charging capacitor C. When the release lever R is depressed to the first position $S_1$, the switch $SW_1$ is opened and the transistor $Q_4$ is turned off and the transistors $Q_1$-$Q_3$ are also turned off. When the lever R is further depressed to the second position $S_2$, the switch $SW_2$ is closed to cause the charge stored in the capacitor C to be discharged through the magnet coil Mg. By this, an electromagnetic release mechanism is operated as is well-known.

When the release lever R is released, it is returned to its original position (solid-line position of FIG. 2) by a spring G and the switch $SW_1$ is closed while the switch $SW_2$ is opened. Thus, the initial condition is restored.

The charging switch circuit comprises a parallel connection of the emitter-grounded PNP transistor $Q_1$ with the capacitor C as the load and a composite NPN transistor consisting of the collector-grounded NPN transistor $Q_2$ with the capacitor C as the load and the PNP transistor $Q_3$. The bases of the PNP transistor $Q_1$ and the composite NPP transistor are connected to the collector of the transistor $Q_4$ so that ON-OFF switching is effected in accordance with the base input of the transistor $Q_4$. The switchings of the transistors $Q_1$-$Q_4$ are all of the same phase.

Figure 3:
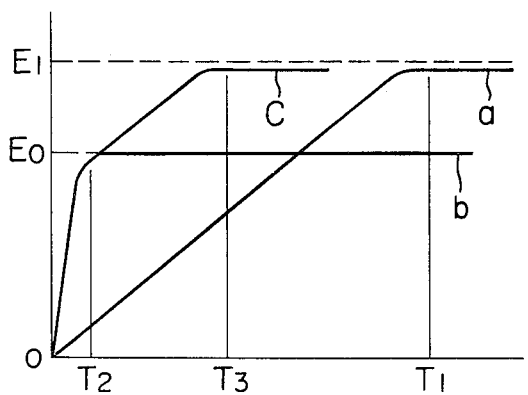
FIG. 3 illustrates the chargig characteristic of the circuit of FIG. 1, with the vertical axis representing the charging voltage of a capacitor C and the horizontal axis representing the charging time.

FIG. 3 shows the charging characteristic of the capacitor C. Curve a shows the charging characteristic when only the emitter-grounded NPN transistor $Q_1$ is turned on. At this time, the saturation resistance of the ON resistance (emitter-collector) is high and therefore, the charging time $T_1$ is long. On the other hand, curve b shows the charging characteristic when only the composite NPN transistor comprising the collector-grounded transistors $Q_2$ and $Q_3$ is turned on. The interval resistance is small and therefore, the charging time $T_2$ is short but there is a voltage drop (collector saturation voltage) of the order of 0.7 v between the collector and emitter and sufficient charging cannot be effected up to the source voltage $E_1$. The DC power source in a camera is of the order of 3 volts and the charging voltage is reduced to 2.3 volts, so that sufficient energy cannot be imparted to the release magnet coil. In contrast, in the case of the emitter-grounding, the voltage drop between the collector and emitter is merely of the order of 0.2 volt and in this point, it is advantageous but the charging time becomes long as described above.

Curve c shows the charging characteristic when the transistor $Q_1$ and the composite transistor comprising the transistors $Q_2$ and $Q_3$ are parallel-connected. From after the closing of the switch until the charging voltage reaches $E_0$ (a voltage resulting from subtracting the voltage drop of the transistor $Q_2$ from the source voltage $E_1$), the characteristic provided by the current flowing through the transistor $Q_2$ whose internal resistance is small is dominant and the charging is effected up to the voltage $E_0$ in a short time. Thereafter, the current flowing through the transistor $Q_1$ charges the capacitor C until it is saturated at time $T_3$. The time $T_3$ is shorter than $T_1$ and this charging voltage is only lower than the source voltage $E_1$ by the collector saturation voltage (about 0.2 volt).

In the embodiment of FIG. 1, the transistors $Q_3$ and $Q_4$ may be eliminated if design is made such that the bases of the transistors $Q_1$ and $Q_2$ are controlled directly by ON-OFF of the switch $SW_1$. The function of the transistor $Q_3$ in the embodiment of FIG. 1 is chiefly to control the base current of the transistor $Q_2$ by ON-OFF of the transistor $Q_4$.

As has been described above, by constructing the switch circuit by a circuit in which an emitter-grounded PNP (or NPN) transistor and a collector-grounded NPN (or PNP) transistor are connected in a parallel fashion, it is possible to provide a characteristic having the merits provided when these are individually used.

We claim:

1. A capacitor charging circuit in a camera having switch means series-connected between a DC power source and a release magnet energizing capacitor and in which charging of said capacitor is effected by closing said switch means, the improvement residing in that said switch means comprises a parallel connection of an emitter-grounded transistor for a first switch with said capacitor as the load and a collector-grounded transistor for a second switch with said capacitor as the load.

2. A capacitor charging circuit according to claim 1, further comprising a transistor for controlling ON-OFF of said transistors for the first and the second switch and wherein said transistors for the first and the second switch are a composite transistor comprising two transistors one of which differs in polarity from the other so that the directions in which the base currents thereof flow in are coincident, and the base currents of said transistors for the first and the secod switch are controlled by the output current of said control transistor.

* * * * *